US012261356B2

(12) United States Patent
Zhang et al.

(10) Patent No.: US 12,261,356 B2
(45) Date of Patent: Mar. 25, 2025

(54) ANTENNA APPARATUS

(71) Applicant: HUAWEI TECHNOLOGIES CO., LTD., Shenzhen (CN)

(72) Inventors: Wei Zhang, Dongguan (CN); Runxiao Zhang, Dongguan (CN); Johann Baptist Obermaier, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 17/956,496

(22) Filed: Sep. 29, 2022

(65) Prior Publication Data

US 2023/0035855 A1 Feb. 2, 2023

Related U.S. Application Data

(63) Continuation of application No. PCT/CN2021/081487, filed on Mar. 18, 2021.

(30) Foreign Application Priority Data

Mar. 31, 2020 (CN) ........................ 202010246575.7

(51) Int. Cl.
*H01Q 1/42* (2006.01)
*H01Q 1/00* (2006.01)

(52) U.S. Cl.
CPC ............... *H01Q 1/42* (2013.01); *H01Q 1/005* (2013.01)

(58) Field of Classification Search
CPC ................................ H01Q 1/42; H01Q 1/005
See application file for complete search history.

(56) References Cited

U.S. PATENT DOCUMENTS

| | | | | |
|---|---|---|---|---|
| 3,175,220 A * | 3/1965 | Schetne | H01Q 1/421 | 343/705 |
| 5,896,112 A * | 4/1999 | Bickford | H01Q 1/002 | 343/872 |
| 11,394,102 B2 * | 7/2022 | Weber | F15D 1/12 | |
| 2005/0062664 A1 * | 3/2005 | Hidai | H01Q 1/42 | 343/753 |
| 2005/0163963 A1 * | 7/2005 | Munro | B64C 21/10 | 428/88 |
| 2009/0096687 A1 * | 4/2009 | Gentilman | B28B 1/001 | 343/705 |
| 2012/0100001 A1 * | 4/2012 | Chen | F04D 29/384 | 416/228 |

(Continued)

FOREIGN PATENT DOCUMENTS

| | | |
|---|---|---|
| CN | 201060700 Y | 5/2008 |
| CN | 106602250 A | 4/2017 |

(Continued)

*Primary Examiner* — Ricardo I Magallanes
*Assistant Examiner* — Jordan E. DeWitt
(74) *Attorney, Agent, or Firm* — Leydig, Voit & Mayer, Ltd.

(57) ABSTRACT

An antenna apparatus is provided. The antenna apparatus in embodiments of this application includes a radome. An interference structure is disposed on a surface of the radome, and the interference structure is configured to change an airflow at a surface boundary layer when the airflow passes through the surface of the radome. The interference structure is disposed on the antenna apparatus to change the airflow at the surface boundary layer.

13 Claims, 6 Drawing Sheets

(56) References Cited

U.S. PATENT DOCUMENTS

| | | | | |
|---|---|---|---|---|
| 2016/0248151 | A1* | 8/2016 | Proshold | H01Q 1/42 |
| 2017/0179589 | A1* | 6/2017 | So | H01Q 1/246 |
| 2017/0301983 | A1 | 10/2017 | Renilson et al. | |
| 2021/0344098 | A1* | 11/2021 | Huang | H01Q 1/246 |

FOREIGN PATENT DOCUMENTS

| | | | |
|---|---|---|---|
| CN | 208173794 | U | 11/2018 |
| CN | 208272135 | U | 12/2018 |
| CN | 109638449 | A | 4/2019 |
| CN | 112018515 | A | 12/2020 |
| CN | 212517516 | U | 2/2021 |
| DE | 202018006123 | U1 | 4/2019 |
| JP | 2018507665 | A | 3/2018 |
| WO | 2017165512 | A1 | 9/2017 |
| WO | 2019161818 | A1 | 8/2019 |

* cited by examiner

ANTENNA APPARATUS

CROSS-REFERENCE TO RELATED APPLICATIONS

This application is a continuation of International Application No. PCT/CN2021/081487, filed on Mar. 18, 2021, which claims priority to Chinese Patent Application No. 202010246575.7, filed on Mar. 31, 2020. The disclosures of the aforementioned applications are incorporated herein by reference in their entirety.

TECHNICAL FIELD

Embodiments of this application relate to the field of communications apparatuses, and in particular, to an antenna apparatus.

BACKGROUND

With development of the wireless communications industry, communications frequency bands and standards continuously increase, a quantity of base station antennas that are used as transmit antennas and that receive wireless signals continuously increases, a size of a radome also increases, and antenna windload increases accordingly, and therefore safety of a communications tower is affected.

In an existing technology in which windload on a radome is reduced, windload on the front (at an angle of 0°), a side surface (at an angle of 90°), and the back of an antenna is reduced by increasing amplitude of circular corners on the periphery of the radome.

A radome with large circular corners can reduce wind resistance in some wind direction angles, for example, at symmetrical angles such as 0°, 90°, and 180°. However, when there is a deviation angle between a wind direction and the radome at a high wind speed, the radome generates a large lift force like an airplane wing, causing an increase in a resultant force of windload on the antenna and relatively large windload on the radome in the case of existence of the deviation angle. Consequently, safety of a communications tower connected to the radome is affected.

SUMMARY

Embodiments of this application provide an antenna apparatus, to reduce windload on the antenna apparatus when an airflow passes through a surface of the antenna apparatus.

A first aspect of embodiments of this application provides an antenna apparatus. The antenna apparatus includes a radome, and an interference structure is disposed on a surface of the radome. The interference structure is configured to: when the antenna apparatus is disposed at a high altitude, change flowing of the airflow at a surface boundary layer because the airflow is subjected to the interference structure when the airflow passes through an arc-shaped corner surface of the radome.

In this embodiment of this application, the interference structure is disposed on the antenna apparatus, so that when the airflow passes through the surface of the radome, flowing of the airflow at the surface boundary layer is changed on the arc-shaped corner surface of the radome, thereby reducing a resultant force of windload on the antenna apparatus.

With reference to the implementation of the first aspect of embodiments of this application, in a first implementation of the first aspect of embodiments of this application, the antenna apparatus further includes an antenna body and a pole, and the antenna body is disposed in the radome. It may be understood that there may be one or more antenna bodies. The antenna is connected to the pole.

In this embodiment of this application, the antenna apparatus further includes the antenna body and the pole, so that feasibility of the solution is improved.

With reference to the first aspect or the first implementation of the first aspect of embodiments of this application, in a second implementation of the first aspect of embodiments of this application, the interference structure is an interference structure formed through a blister molding process when the radome is produced or processed.

In this embodiment of this application, the interference structure is formed through a blister molding process, so that feasibility of the solution is improved.

With reference to the first aspect and the first and the second implementations of the first aspect of embodiments of this application, in a third implementation of the first aspect of embodiments of this application, the interference structure is an interference structure formed through a knurling process when the radome is produced or processed.

In this embodiment of this application, the interference structure is formed through a knurling process, so that feasibility of the solution is improved.

With reference to the first aspect and the first to the third implementations of the first aspect of embodiments of this application, in a fourth implementation of the first aspect of embodiments of this application, the interference structure is an interference structure formed through a molding process when the radome is produced or processed.

In this embodiment of this application, the interference structure is formed through a molding process, so that feasibility of the solution is improved.

With reference to the first aspect and the first to the fourth implementations of the first aspect of embodiments of this application, in a fifth implementation of the first aspect of embodiments of this application, the interference structure is a standalone structure, and is detachably connected to the radome.

In this embodiment of this application, the interference structure is detachably connected to the radome, so that convenience of mounting and transportation processes are improved.

With reference to the first aspect and the first to the fifth implementations of the first aspect of embodiments of this application, in a sixth implementation of the first aspect of embodiments of this application, the interference structure includes a flow disturbing tripwire.

In this embodiment of this application, when the interference structure includes the flow disturbing tripwire, feasibility of the solution is improved.

With reference to the first aspect and the first to the sixth implementations of the first aspect of embodiments of this application, in a seventh implementation of the first aspect of embodiments of this application, the interference structure includes a rough surface.

In this embodiment of this application, when the interference structure includes the rough surface, feasibility of the solution is improved.

With reference to the first aspect and the first to the sixth implementations of the first aspect of embodiments of this application, in a seventh implementation of the first aspect of embodiments of this application, the flow disturbing tripwire is a convex flow disturbing tripwire.

In this embodiment of this application, when the flow disturbing tripwire is a convex flow disturbing tripwire, feasibility of the solution is improved.

With reference to the first aspect and the first to the seventh implementations of the first aspect of embodiments of this application, in an eighth implementation of the first aspect of embodiments of this application, the flow disturbing tripwire is a concave flow disturbing tripwire.

In this embodiment of this application, when the flow disturbing tripwire is a concave flow disturbing tripwire, feasibility of the solution is improved.

With reference to the first aspect and the first to the eighth implementations of the first aspect of embodiments of this application, in a ninth implementation of the first aspect of embodiments of this application, the rough surface is a set of circular convex points or circular concave surfaces.

In this embodiment of this application, when the rough surface is a set of circular convex points or circular concave surfaces, feasibility of the solution is improved.

With reference to the first aspect and the first to the ninth implementations of the first aspect of embodiments of this application, in a tenth implementation of the first aspect of embodiments of this application, the rough surface is a set of polygonal convex points or polygonal concave surfaces.

In this embodiment of this application, when the rough surface is a set of polygonal convex points or polygonal concave surfaces, feasibility of the solution is improved.

With reference to the first aspect and the first to the tenth implementations of the first aspect of embodiments of this application, in an eleventh implementation of the first aspect of embodiments of this application, four corners of a cross section of the radome are arc-shaped corners.

In this embodiment of this application, when the four corners of the cross section of the radome are arc-shaped corners, windload of airflows from 0°, 90°, and 180° can be effectively reduced.

With reference to the first aspect and the first to the tenth implementations of the first aspect of embodiments of this application, in an eleventh implementation of the first aspect of embodiments of this application, the interference structure is obtained by performing an extrusion process on the radome.

In this embodiment of this application, when the interference structure is obtained by performing an extrusion process on the radome, feasibility of the solution is improved.

With reference to the first aspect and the first to the eleventh implementations of the first aspect of embodiments of this application, in a twelfth implementation of the first aspect of embodiments of this application, the interference structure is obtained by performing a blow molding process on the radome.

In this embodiment of this application, when the interference structure is obtained by performing a blow molding process on the radome, feasibility of the solution is improved.

With reference to the first aspect and the first to the twelfth implementations of the first aspect of embodiments of this application, in a thirteenth implementation of the first aspect of embodiments of this application, the interference structure is obtained by performing a blister molding process on the radome.

In this embodiment of this application, when the interference structure is obtained by performing a blister molding process on the radome, feasibility of the solution is improved.

With reference to the first aspect and the first to the thirteenth implementations of the first aspect of embodiments of this application, in a fourteenth implementation of the first aspect of embodiments of this application, the interference structure is obtained by performing an injection molding process on the radome.

In this embodiment of this application, when the interference structure is obtained by performing an injection molding process on the radome, feasibility of the solution is improved.

It can be learned from the foregoing technical solutions that embodiments of this application have the following advantages.

The interference structure is disposed on the surface of the radome, so that flowing of the airflow at the surface boundary layer is changed, thereby reducing a resultant force of windload and improving safety of connecting the radome to a communications tower.

DESCRIPTION OF EMBODIMENTS

Embodiments of this application provide an antenna apparatus, to change flowing of an airflow at a surface boundary layer when the airflow passes through a surface of the antenna apparatus, thereby reducing a resultant force of windload and improving safety of connecting a radome to a communications tower.

In this specification, the claims, and the accompanying drawings of this application, terms "first", "second", "third", "fourth", and the like (if existent) are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein. In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

Implementation principles and specific implementations of technical solutions in this application and beneficial effects that can be correspondingly achieved by the technical solutions are described below in detail with reference to the accompanying drawings.

Figure 1:
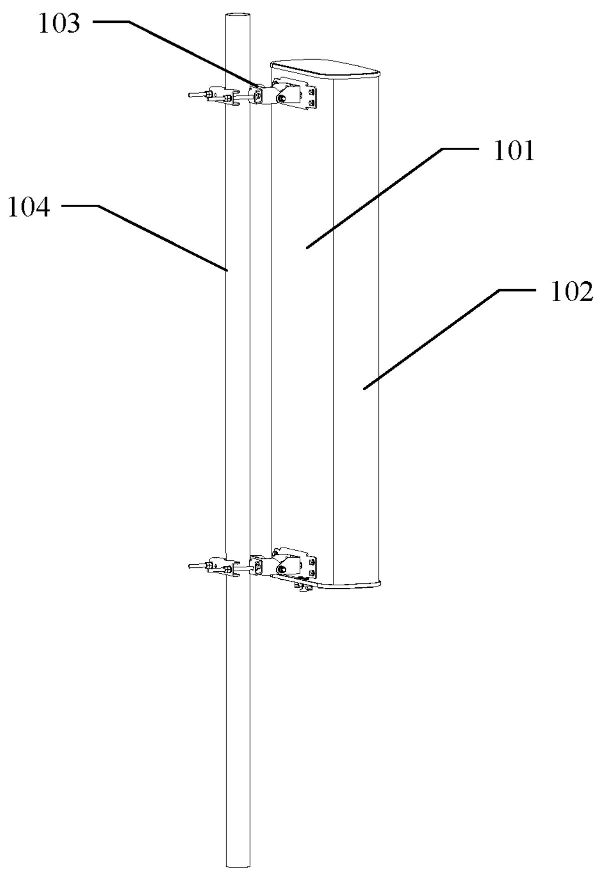
FIG. 1 is a schematic diagram of a structure of an antenna apparatus according to this application.

FIG. 1 is a schematic diagram of a structure of an antenna apparatus according to this application.

The antenna apparatus includes an antenna body 101, a radome 102, a mounting assembly 103, and a pole 104. The antenna body 101 is disposed in the radome 102, a fixing point is disposed on a surface of the radome 102, the fixing point is configured to fasten the mounting assembly 103, and the mounting assembly 103 is configured to fasten the radome 102 and the pole 104.

It may be understood that there may be one, two, or more antenna bodies 101 built in the radome 102. This is not specifically limited herein.

The mounting assembly 103 may be movably connected to the radome 102 by using a bolt, or the mounting assembly 103 may be fastened to the radome 102 through pasting. It may be understood that the mounting assembly 103 may be connected to the radome 102 in another manner, provided that the mounting assembly 103 is tightly connected to the radome 102. This is not specifically limited herein.

For example, when the mounting assembly 103 is movably connected to the radome 102 by using a bolt, the mounting assembly 103 includes a base with bolt holes. The bolt holes of the base are in a one-to-one correspondence with bolt holes on a side surface of the radome, so that the base can be fastened to the radome by using the bolt. The mounting assembly 103 is fastened to the base. The other side of the mounting assembly 103 may also be movably connected to the pole 104 by using a bolt. It may be understood that the mounting assembly 103 may not be movably connected to the radome 102 by using the base with bolt holes, but is directly movably connected to the radome 102 by using bolt holes on one side of the mounting assembly 103. This is not specifically limited herein.

In an actual application process, the mounting assembly 103 may be alternatively tightly connected to the radome 102 by using a top surface of the radome 102. This is not specifically limited herein. For example, bolt holes are disposed on the top surface of the radome 102, and the mounting assembly 103 is tightly connected to the radome 102 by using the bolt holes on the top surface of the radome 102.

The pole 104 may be shaped in a cylinder or a cuboid, or may be a pole of another shape. This is not specifically limited herein.

The following describes the antenna apparatus in this application in detail with reference to the foregoing structure of the antenna apparatus.

Figure 2:
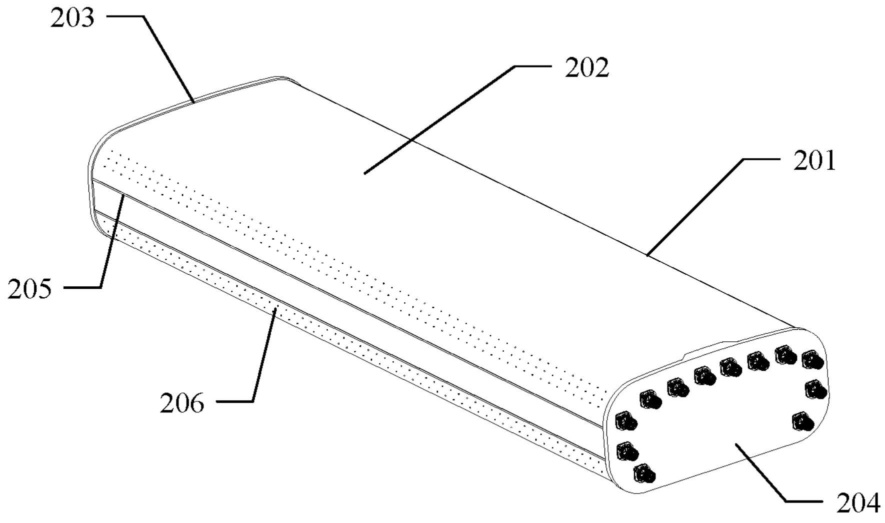
FIG. 2 is a schematic diagram of another structure of an antenna apparatus according to this application.

FIG. 2 is a schematic diagram of a structure of an antenna according to this application.

The antenna includes a radome 201, an antenna body 202, an upper-end cover 203, and a lower-end cover 204. The antenna body 202 is built in the radome 201. The upper-end cover 203 is tightly connected to an upper end of the radome 201, and the lower-end cover 204 is tightly connected to a lower end of the radome 201, so that the upper-end cover 203, the radome 201, and the lower-end cover 204 form an entire antenna apparatus.

As shown in FIG. 2, in an actual application process, bolt holes may be disposed on the lower-end cover 204 and/or the upper-end cover 203, and the lower-end cover 204 and/or the upper-end cover 203 are or is tightly connected to the radome 201 by using the bolt holes of the lower-end cover 204 and/or the upper-end cover 203. It may be understood that the lower-end cover 204 and/or the upper-end cover 203 may be tightly connected to the radome 201 in another manner. For example, the lower-end cover 204 and/or the upper-end cover 203 are or is tightly connected to the radome 201 through a buckle connection. For example, buckle slots or a buckle slot are or is disposed on the lower-end cover 204 and/or the upper-end cover 203, and buckles are disposed at the upper end or the lower end of the radome 201, so that when the lower end or the upper end of the radome 201 is connected to the lower-end cover 204 and/or the upper-end cover 203, a lower-end buckle part or an upper-end buckle part of the radome 201 is exactly built into the buckle slot, and therefore the lower-end cover 204 and/or the upper-end cover 203 are tightly connected to the radome 201. It may be understood that the upper-end cover 203 and the lower-end cover 204 may be connected to the radome in another manner. This is not specifically limited herein.

An interference structure is disposed on the side surface (an arc-shaped corner surface) of the radome 201, and the interference structure is configured to change flowing of an airflow at a surface boundary layer when the airflow passes through a surface of the radome, to reduce windload.

It may be understood that, in an actual application process, four corners of a cross section of the radome may be of another shape. For example, the four corners of the cross section of the radome may be right angles. This is not specifically limited herein.

Optionally, in a possible implementation, as shown in FIG. 2, the interference structure may be a tripwire 205, and the tripwire 205 is disposed on the side surface of the radome 201. The tripwire 205 may be obtained by performing special process processing on the radome 201, or may be pasted to the surface of the radome 201. This is not specifically limited herein.

For example, the tripwire 205 may be obtained through an extrusion process when the radome is produced. It may be understood that the tripwire 205 may be alternatively obtained through a knurling process, a molding process, a blister molding process, an injection molding process, or a blow molding process when the radome is produced. This is not specifically limited herein.

Figure 3:
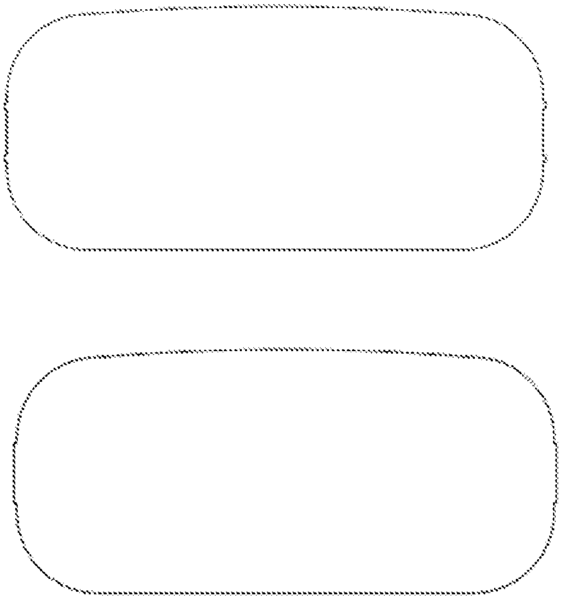
FIG. 3 is a schematic diagram of another structure of an antenna apparatus according to this application.
Figure 4:
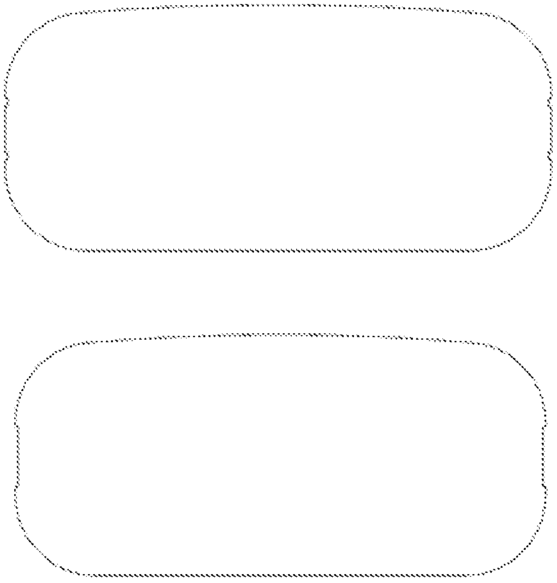
FIG. 4 is a schematic diagram of another structure of an antenna apparatus according to this application.

FIG. 3 is a cross-sectional view of a radome. As shown in FIG. 3, the tripwire 205 may be a tripwire protruding from the side surface of the radome. It may be understood that the tripwire 205 may be a tripwire of another form. FIG. 4 is a cross-sectional view of a radome. As shown in FIG. 4, the tripwire 205 may be a tripwire recessed in the side surface of the radome. A specific existence form of the tripwire is not limited herein.

Figure 5:
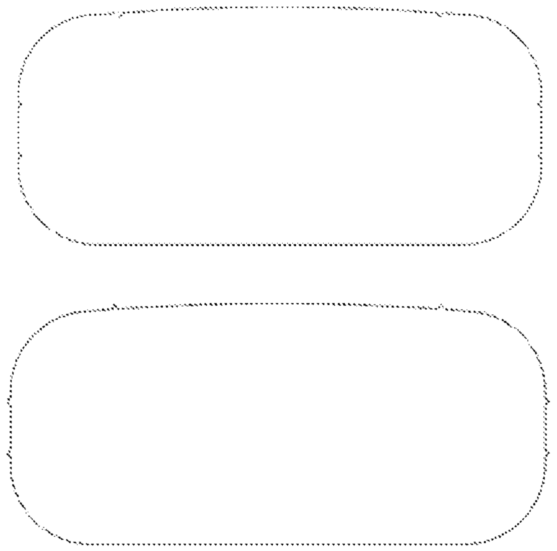
FIG. 5 is a schematic diagram of another structure of an antenna apparatus according to this application.

In an actual application process, the tripwire 205 may be alternatively disposed on another surface of the radome. FIG. 5 is a cross-sectional view of a radome. For example, as shown in FIG. 5, the tripwire 205 is disposed on three side surfaces of the radome. It may be understood that the tripwire may be alternatively disposed on another surface of another radome. This is not specifically limited herein.

Optionally, in a possible implementation, as shown in FIG. 2, the interference structure may be a rough point 206, and the rough point 206 is disposed on the side surface of the radome 201. The rough point 206 may be obtained by performing special process processing on the radome 201, or may be pasted to the surface of the radome 201. This is not specifically limited herein.

For example, the rough point 206 may be obtained through an extrusion process when the radome is produced. It may be understood that the rough point 206 may be alternatively obtained through a knurling process, a molding process, a blister molding process, an injection molding process, or a blow molding process when the radome is produced, or a material molding parameter is adjusted when the radome is produced, so that a rough point is formed on the surface of the radome. This is not specifically limited herein.

Figure 6:
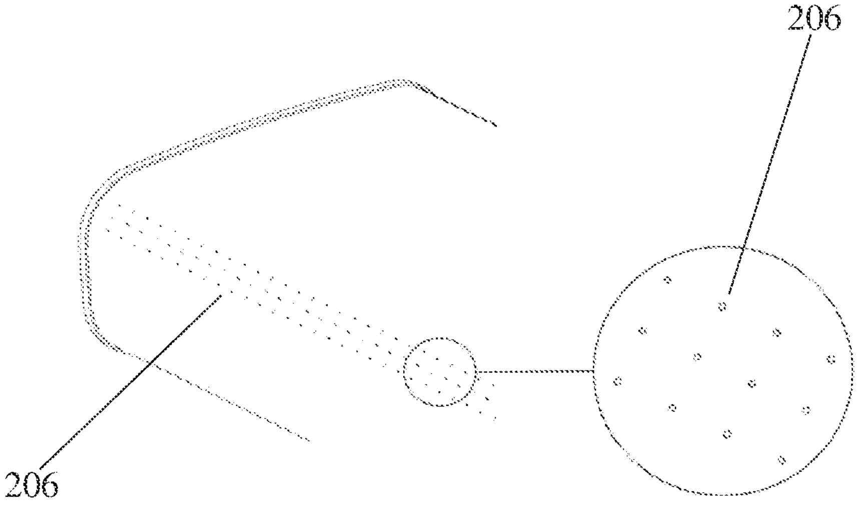
FIG. 6 is a schematic diagram of another structure of an antenna apparatus according to this application.
Figure 7:
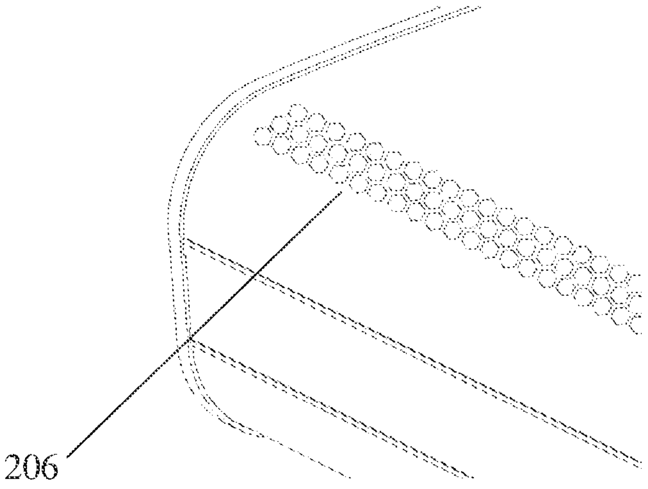
FIG. 7 is a schematic diagram of another structure of an antenna apparatus according to this application.

FIG. 6 is a cross-sectional view of a radome. As shown in FIG. 6, the rough point 206 may be a circular convex or concave point protruding from the side surface of the radome. It may be understood that the rough point 206 may be a rough point of another form. FIG. 7 is a cross-sectional view of a radome. For example, as shown in FIG. 7, the rough point 206 may be a polygonal convex or concave point. The rough point 206 may be alternatively a rough point of another shape. This is not specifically limited herein.

In an actual application process, the rough point 206 may be alternatively disposed on another surface of the radome. For example, the rough point 206 is disposed on three surfaces of the radome. It may be understood that the rough point may be alternatively disposed on another surface of another radome. This is not specifically limited herein.

In a possible implementation, the interference structure may alternatively include both the tripwire 205 and the rough point 206. This is not specifically limited herein.

Figure 8:
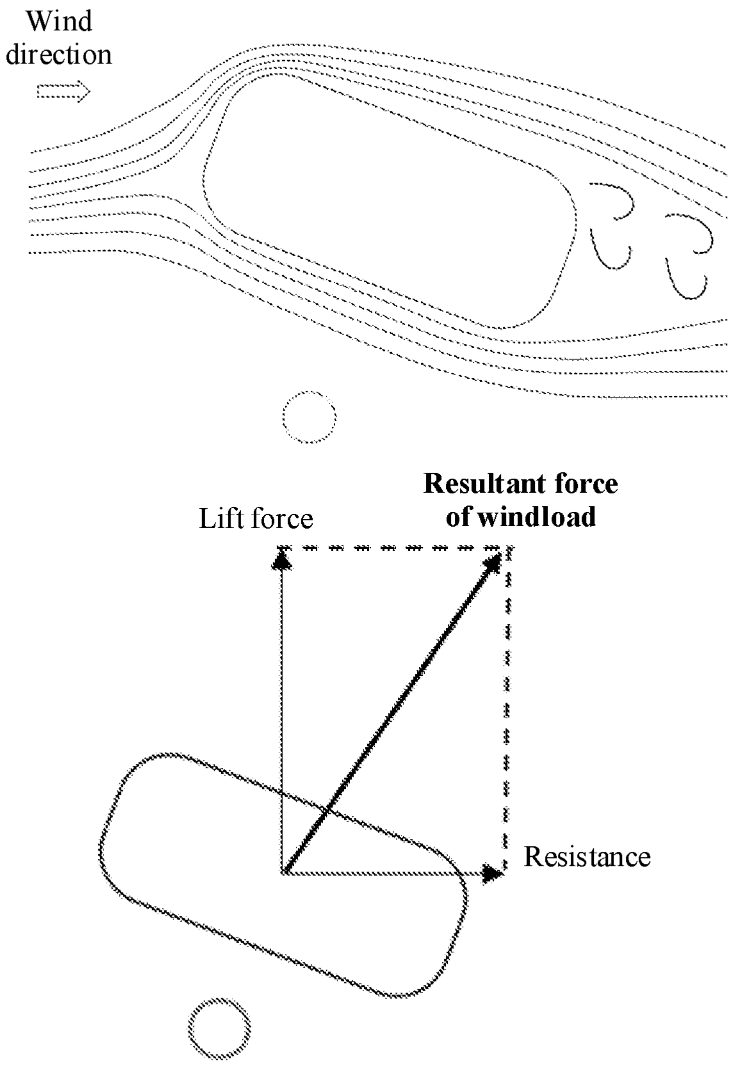
FIG. 8 is a diagram of an effect of an existing antenna apparatus according to this application.

When the antenna is installed on the pole, the antenna is in a high-altitude environment, and strength of an airflow is relatively large. In a process in which the airflow passes through a surface of the antenna, because airflows are from different angles, when there is a deviation angle between the antenna and a wind direction of the airflow; the radome is like an airplane wing and boundary layer separation is relatively late because of a streamline type feature of the antenna. FIG. 8 is a cross-sectional view of a radome. As shown in FIG. 8, an airflow velocity on an upper surface of the antenna is large, an airflow velocity on a lower surface is small. According to Bernoulli's principle, pressure is small on the upper surface with a large airflow velocity, and pressure is large on the lower surface with a small airflow velocity. Therefore, a relatively large lift force acts on the antenna. When the lift force and a resistance are combined, a relatively large resultant force of windload acts on the antenna. The resultant force of windload acting on the antenna is finally transmitted to the pole through the mounting assembly. Therefore, the pole is subjected to relatively large windload, and safety of the antenna and the pole is affected.

Figure 9:
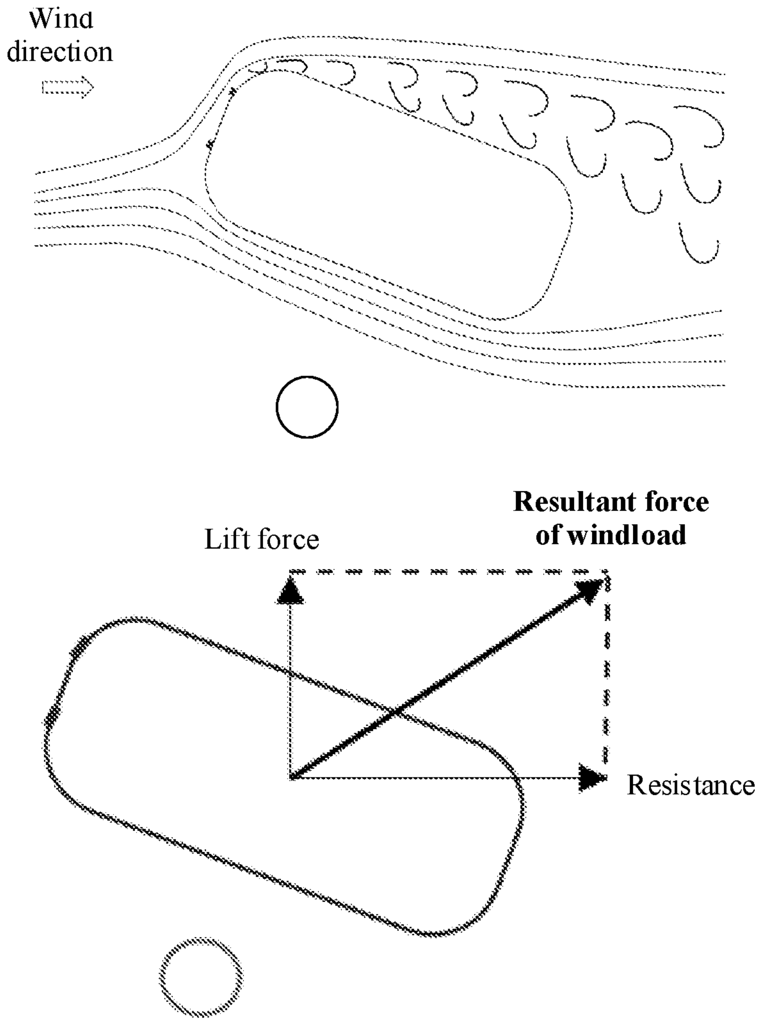
FIG. 9 is a diagram of an effect of an antenna apparatus according to this application.

In this embodiment of this application, the interference structure such as the tripwire 205 or the rough point 206 is disposed on the surface of the radome 201. Therefore, when the airflow passes through the interference structure such as the tripwire 205 or the rough point 206 on the surface of the radome 201, flowing of the airflow at the surface boundary layer is changed, and a turbulent wake is generated on the surface of the antenna, as shown in FIG. 9. FIG. 9 is a cross-sectional view of a radome. Therefore, the antenna is in a stalled state, and the lift force significantly decreases, so that the resultant force of windload acting on the antenna decreases, and the windload on the pole is reduced, thereby improving safety of the antenna and the pole.

In several embodiments provided in this application, it should be understood that the disclosed apparatuses and methods may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

What is claimed is:

1. An antenna apparatus, comprising:

a radome, wherein an interference structure is disposed on a surface of the radome, and the interference structure is configured to decrease a lift force based on the airflow passing along the surface of the radome and there is a deviation angle between an airflow direction and the radome;

wherein the interference structure comprises at least four flow disturbing tripwires, and two of the flow disturbing tripwires are disposed on each of two opposite side surfaces of the radome, wherein each of the two flow disturbing tripwires that are disposed on each of two opposite side surfaces of the radome comprises a convex and straight flow disturbing tripwire.

2. The antenna apparatus according to claim 1, wherein each side surface comprises two arc-shaped corners and a side plane, and each of the two flow disturbing tripwires is disposed in a region of each arc-shaped corner adjacent to the side plane.

3. The antenna apparatus according to claim 1, wherein each side surfaces comprises two arc-shaped corners and a side plane, and each of the two flow disturbing tripwires is disposed in a joint region between each arc-shaped corner and the side plane.

4. The antenna apparatus according to claim 3, wherein the joint region is a tangent line between one of the two arc-shaped corners and the side plane.

5. The antenna apparatus according to claim 2, wherein the antenna apparatus further comprises:

an antenna body, wherein the antenna body is disposed in the radome; and the radome is connected to a pole.

6. The antenna apparatus according to claim 1, wherein the number of flow disturbing tripwires is four.

7. The antenna apparatus according to claim 1, wherein the interference structure further comprises a rough surface.

8. The antenna apparatus according to claim 7, wherein the rough surface is disposed on the side surfaces of radome, or the rough surface is disposed on three surfaces of the radome.

9. The antenna apparatus according to claim 7, wherein each side surface comprises two arc-shaped corners and a side plane, and the rough surface is disposed on the arc-shaped corners.

10. The antenna apparatus according to claim 7, wherein the rough surface is a set of circular points.

11. The antenna apparatus according to claim 10, wherein the set of circular points is a set of circular convex points or circular concave surfaces.

12. The antenna apparatus according to claim 7, wherein the rough surface is a set of polygonal points.

13. The antenna apparatus according to claim 12, wherein the set of polygonal points is a set of polygonal convex points or polygonal concave surfaces.

* * * * *